United States Patent
Madhavan et al.

(10) Patent No.: US 12,504,910 B1
(45) Date of Patent: Dec. 23, 2025

(54) OPTIMIZED DATA STRUCTURE, AND METHOD OF GENERATING SAME, FOR EFFICIENT STORAGE OF DATA IN, AND RETRIEVAL FROM, A COMPUTER MEMORY

(71) Applicant: Chicago Mercantile Exchange Inc., Chicago, IL (US)

(72) Inventors: Ajay Sunderajan Madhavan, Aurora, IL (US); Jayanth Pridhvi Raj Recherla, Elgin, IL (US); Balaji Rengachari, Aurora, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 492 days.

(21) Appl. No.: 17/503,925

(22) Filed: Oct. 18, 2021

(51) Int. Cl.
*G06F 3/06* (2006.01)
*G06F 12/1018* (2016.01)

(52) U.S. Cl.
CPC .......... *G06F 3/0655* (2013.01); *G06F 3/0604* (2013.01); *G06F 3/0638* (2013.01); *G06F 3/0679* (2013.01); *G06F 12/1018* (2013.01)

(58) Field of Classification Search
CPC ........................... G06F 3/0638; G06F 12/1018
See application file for complete search history.

(56) References Cited

U.S. PATENT DOCUMENTS

| | | | |
|---|---|---|---|
| 8,099,347 B2 | 1/2012 | Deaddio et al. | |
| 9,251,197 B2 * | 2/2016 | Raufman | ............ G06F 16/2365 |
| 9,740,685 B2 | 8/2017 | Beaurpere et al. | |
| 9,824,341 B2 | 11/2017 | Deaddio et al. | |
| 10,565,986 B2 | 2/2020 | Kakirwar et al. | |
| 10,817,490 B2 * | 10/2020 | Li | .......................... G06F 16/258 |
| 2009/0144186 A1 | 6/2009 | Debarre | |
| 2012/0102298 A1 * | 4/2012 | Sengupta | ............ G06F 12/0864 |
| | | | 711/216 |

(Continued)

OTHER PUBLICATIONS

Wikipedia, "Hash function", Apr. 27, 2020 [retrieved from internet Jun. 18, 2024][<URL:https://web.archive.org/web/20200427013135/https://en.wikipedia.org/wiki/Hash_function>] (Year: 2020).*

(Continued)

*Primary Examiner* — Nicholas A. Paperno
(74) *Attorney, Agent, or Firm* — Lempia Summerfield Katz LLC

(57) ABSTRACT

The disclosed embodiments relate to systems and methods for generating a compact in memory key-value data structure/database which may or may not be hierarchical, i.e., include nested key-value data structures, which can be utilized for other applications. The key-value data to be encoded and stored in the generated database may be extracted from another database, such as a relational database, or other source. It will be appreciated that the disclosed embodiments may be used to encode and store any data, not just key-value data sets, which would benefit from the compact long-aligned form generated thereby. The resultant compact data structure may be efficiently accessed to directly retrieve particular data or search for particular data and such access may be enabled using a defined notation/syntax and/or one or more intermediary processes or programs.

37 Claims, 3 Drawing Sheets

(56) References Cited

U.S. PATENT DOCUMENTS

2015/0095298 A1\* 4/2015 Mann ............... G06F 16/211
　　　　　　　　　　　　　　　　　　　707/698
2015/0213552 A1　7/2015 Silvano

OTHER PUBLICATIONS

Wikipedia, "Hash function", Jul. 19, 2012 [retrieved from internet Jun. 18, 2024][<URL:https://web.archive.org/web/20120719060250/https://en.wikipedia.org/wiki/Hash_function>] (Year: 2012).\*
"In-Memory Databases Versus In-Memory Data Grids", A Business-Level Perspective on In-Memory Computing, white paper, Jan. 13, 2021, 8 pages, Hazelcast.

\* cited by examiner

OPTIMIZED DATA STRUCTURE, AND METHOD OF GENERATING SAME, FOR EFFICIENT STORAGE OF DATA IN, AND RETRIEVAL FROM, A COMPUTER MEMORY

BACKGROUND

Computer/software performance is dependent, at least in part, on efficient access to data, e.g., the ability to efficiently manage and retrieve information from the one or more electronic data stores in which the information is stored.

Typical computer systems implement a hierarchy of multiple memory/storage technologies used to store electronic data, which vary in terms of function, cost, capacity and speed, etc., to provide an ideal balance between efficiency/performance/functionality and cost and/or capacity. For example, a typical memory hierarchy may include a low cost large capacity relatively low performance non-volatile memory for long term data storage, such as a hard drive or solid state disk, an intermediate cost intermediate capacity intermediate performance volatile memory for more reasonably fast access, such as dynamic random access memory, one or more higher cost smaller capacity higher performance volatile cache memories for storing immediately accessible data, and high cost low capacity high performance registers for storing data that is currently being operated on.

In such a memory hierarchy, it is often desirable to store as much of the data required, or anticipated to be required, by the processor/software as close to the processor as possible, e.g., in one of the cache memories of the memory architecture/hierarchy.

As the closest/fastest memory tends to, as a function of cost and/or access performance, have the smallest capacity, efficient utilization of that memory maximizes the amount of data to which the software can have the fastest access and may further improve the speed of such access and overall performance of computer.

DETAILED DESCRIPTION

Figure 1:
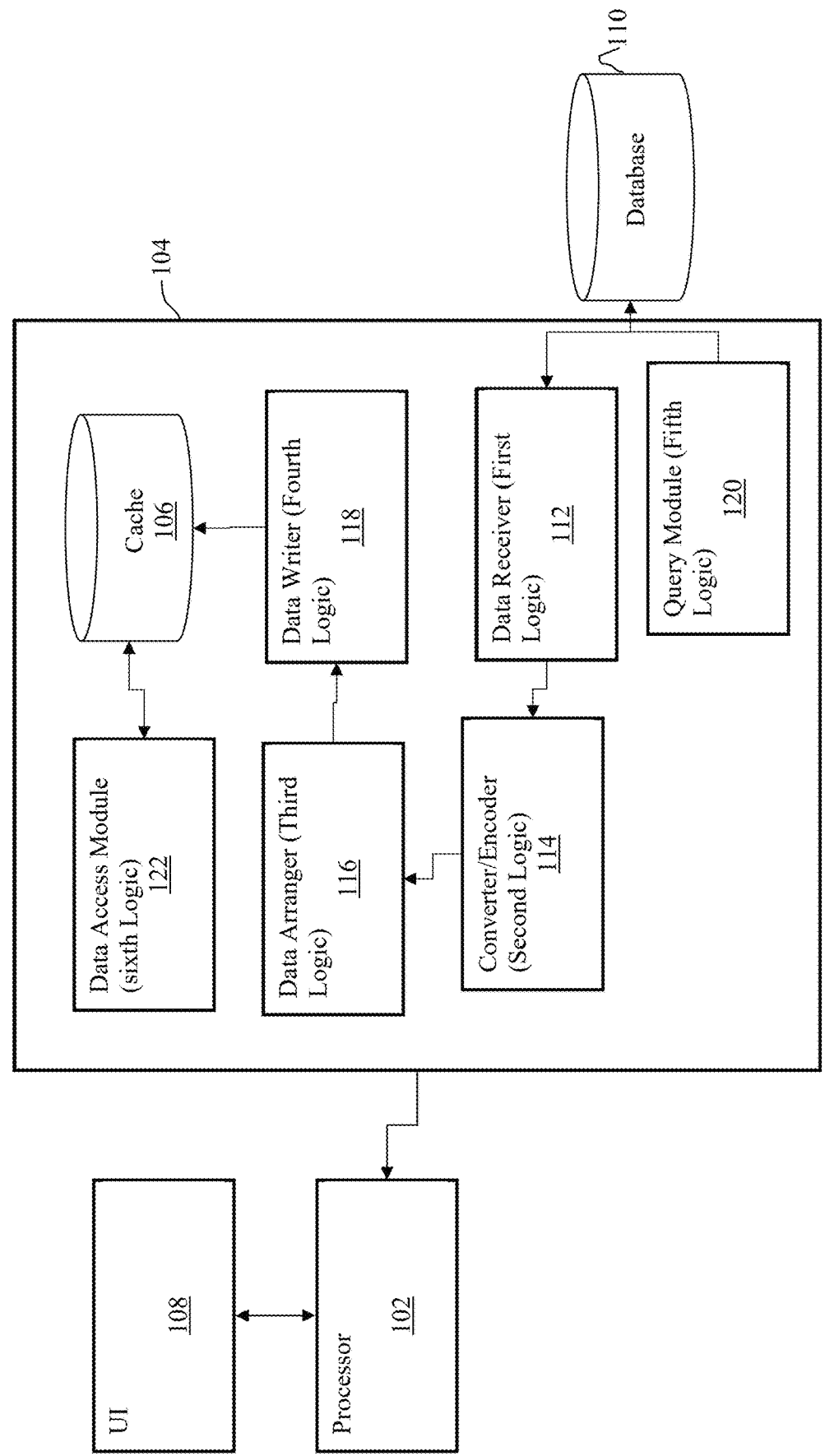
FIG. 1 depicts a computer system according to at least one embodiment.

The disclosed embodiments relate to systems and methods for generating a compact in memory key-value data structure/database which may or may not be hierarchical, i.e., include nested key-value data structures, which can be utilized for other applications. The key-value data to be encoded and stored in the generated database may be extracted from another database, such as a relational database, or other source. It will be appreciated that the disclosed embodiments may be used to encode and store any data, not just key-value data sets, which would benefit from the compact long-aligned form generated thereby. The resultant compact data structure may be efficiently accessed to directly retrieve particular data or search for particular data and such access may be enabled using a defined notation/syntax and/or one or more intermediary processes or programs.

In one implementation, the disclosed embodiments are implemented in the Java Map Interface, an object that maps keys to values and support get, put, delete and other method implementations. The disclosed embodiments provide the internal storage for this function.

As was discussed briefly above, in computer architectures, the memory hierarchy, also referred to as the storage or memory architecture or model, separates computer storage into a hierarchy of different interconnected memories/storage devices based essentially on performance as measured, for example, by response time, i.e., the time it takes the memory to provide data stored therein or write data thereto in response to a request therefore, and cost. Since performance, complexity, and capacity, as well as cost, are all inter-related, the levels of the memory hierarchy may also be distinguished by their performance and controlling technologies.

As was noted, a typical memory hierarchy of a computer may include a secondary memory external to the processor which comprises a low cost high capacity, and typically non-volatile, storage with moderate performance, such as a hard disk drive or solid state drive. The memory hierarchy may further include a main memory external to the processor which comprises a moderate cost, moderate capacity and moderate performance volatile storage, such as dynamic random access memory. The memory hierarchy may further include one or more cache memories, arranged as intermediate levels of the hierarchy between the main memory and the processor, which comprise high cost, high performance lower capacity volatile storage external to and/or integrated with the processor, e.g., on the same die, in the same package, etc. Finally, the memory hierarchy may include one or more registers which are storage devices typically provided within the processor, e.g., within the processor's core processing logic, for storing data or program instructions which, for example, are currently being operated on.

As was noted, given that higher performance memories are typically lower capacity (which may contribute to their performance) and/or more expensive, they are usually limited in capacity and deployed in the computer architecture where they may provide the most benefit as a function of the capacity and cost thereof. Accordingly, in terms of the memory hierarchy, one may find that the storage devices positioned from those closest, logically and/or physically, to the processor to those located furthest away, utilize different memories characterized by decreasing performance/cost and increased capacity with, for example, the highest performance/cost, lowest capacity memory used to implement the cache memories closest to the processor for storing data known or anticipated to be immediately needed, while the lowest performance/cost, highest capacity memory is used furthest away from the processor for bulk or long term storage of data and programs.

It will be appreciated that as memory and processor technologies improve, those memory technologies previously reserved for high performance applications due to cost may become less costly thereby making them suitable for use in higher capacities and/or for other less performance-demanding applications as part of an overall system improvement, where newer even higher performance technologies are then developed for use in those high performance-demanding applications, the overall performance of the computer system being improved thereby. However, it will be understood that higher performance memory technologies, as compared to other available lesser performing technologies, will always be more expensive, and therefore deployed in lesser relative quantities for use in specific applications which justify their cost. It will therefore be appreciated that disclosed embodiments are technology agnostic and may be applicable to, as will be described, improve the efficiency and performance of both currently available memory technologies as well as later developed technologies.

These memories and memory architectures may further be characterized by the minimal amount of data which may be uniquely addressed in a memory, moved via a single, actual or perceived, processor or memory operation, i.e., retrieved from or stored to a memory, or operated on by the processor in a single, actual or perceived, operation, which may be referred to as the bit width or word size of the computer or processor. Generally, computers do not move just one bit or byte at a time between the storage and computational components, but instead move multiple bytes in one actual or perceived operation. It will be appreciated that, as perceived by a user, a process or program, a task may appear to be a single, e.g., atomic or otherwise guaranteed to complete without interruption, operation despite the actual underlying implementation using more than one operation or function to complete the task. This minimal amount of data may tightly correspond to the number of individual wires which interconnect the components of the computer together, both between and within the integrated circuits which make up the computer, as well as the number of bits/bytes that the processor can operate on in one operation, actual or as perceived by an observer, e.g., user, process or program.

Initially, this amount of data was one-half byte (4 bits) or one byte (8 bits) and quickly improved to 16 bits (2 byte) and 32 bits (4 byte). Presently, most computers may operate on 64 bits (8 bytes) data sizes with some high performance computers operating on 128 bits (16 bytes). It will be appreciated that the disclosed embodiments may be used with any bit width now available or later developed.

The disclosed embodiments will be discussed with respect to a word size of 64 bits (8 bytes), also referred to as a "long." However, it will be appreciated that this is merely an example word size and one of skill in the art would understand that the disclosed embodiments may be implemented in systems having larger or smaller word sizes.

Thus, in the computing environment, the typical minimal amount of data which may be moved or operated upon in a single operation may be referred to as a "word" and is the natural unit of data used by a particular processor design. A word is a fixed-sized piece of data handled as a unit by the instruction set or the hardware of the processor. The number of bits in a word (the word size, word width, or word length) is an important characteristic of any specific processor design or computer architecture. The size of a word is, as noted, dependent on the processor/computer design, e.g. 32 bits, 64 bits or 128 bits, etc. The size of a word is reflected in many aspects of a computer's structure and operation; the majority of the registers in a processor are usually word (or word-multiple) sized and the smallest piece of data that can be transferred to and from the working memory in a single operation is a word in many (not all) architectures, with other amounts being sized in word-multiples. The largest possible address size (the number of bits used to specify an address), used to designate a location in memory, is typically a word, and the unit of addressable memory specified by each address is typically a word or word multiple.

For example, in a given architecture, successive address values designate successive units of memory; this unit is the unit of address resolution. In most computers, the unit is either a character (e.g. a byte) or a word. If the unit is a word, then a larger amount of memory can be accessed using an address of a given size at the cost of added complexity to access less than a word's worth of data, e.g., the processor may be required to retrieve an entire word from the memory and then extract the desired data therefrom.

The memory model of an architecture is strongly influenced by the word size. In particular, the resolution of a memory address, that is, the smallest unit/portion of memory that can be designated by an address, has often been chosen to be the word or a multiple thereof. In this approach, the word-addressable machine approach, address values which differ by one designate adjacent words stored in the memory. This is natural in machines which deal almost always in word (or multiple-word) units, and has the advantage of allowing instructions to use minimally sized fields to contain addresses, which can permit a smaller instruction size or a larger variety of instructions.

In view of the required minimum amount of data which may be uniquely addressed in a memory or moved or operated upon in a single actual or perceived operation, it will be appreciated that to maximize efficiency, data that is stored in a memory should be stored in alignment with this requirement, sometimes referred to as word- or byte-aligned. For example, where the minimum amount of addressable data is 64 bits and the amount of data to be stored is less than 64 bits, it is most efficient to store that data in a single addressable 64 bit memory location rather than across more than one addressable memory location. In the latter case, it would require two memory operations to retrieve the data whereas, if the data is "aligned", i.e., stored in a single addressable location, only one operation is necessary to retrieve that data.

Cache memory operations, i.e., the operations used to move data, e.g., cache lines/blocks, between the cache memory and the main or secondary memories, typically operate on word/byte aligned amounts of data, referred to as blocks or lines, to maximize efficiency.

As will be appreciated, then, as the closest/fastest memory tends to have the smallest capacity, the disclosed embodiments enable efficient utilization of that memory to maximize the amount of data to which the software can have the fastest access and further improve both utility of the data and the speed of such access.

At a higher level, different programming languages and applications executing on a computer define how they store data and each imparts overhead, e.g., additional data or organizational requirements, which reduce the efficiency with which the data can be stored, in exchange for other benefits, etc., such as addressability, memory management, etc.

For example, a programming language may implement a minimum size for a particular type of data. In Java, for example, a string data type requires 40 bytes, no matter if the string is smaller in size, e.g. an empty string.

In computer programming, a string is traditionally a sequence of characters. A string is generally considered as a data type and is often implemented as an array data structure of bytes (or words) that stores a sequence of elements, typically characters, using some character encoding. String may also denote more general arrays or other sequence (or list) data types and structures.

When encoding the characters of a string into binary data, e.g., bits, often each character is stored using one or more bytes, i.e., at least 8 bits. When those characters are encoded using the ASCII seven (7) bit encoding, they are still stored using 8 bits, resulting the extra eighth bit being unused. The ASCII encoding is provided in the following table:

ASCII Table

| dec | oct | hex | Binary (8 bit) | Character/symbol |
|---|---|---|---|---|
| 0 | 0 | 00 | 0000 0000 | NUL (null) |
| 1 | 1 | 01 | 0000 0001 | SOH (start of header) |
| 2 | 2 | 02 | 0000 0010 | STX (start of text) |
| 3 | 3 | 03 | 0000 0011 | ETX (end of text) |
| 4 | 4 | 04 | 0000 0100 | EOT (end of transmission) |
| 5 | 5 | 05 | 0000 0101 | ENQ (enquiry) |
| 6 | 6 | 06 | 0000 0110 | ACK (acknowledge) |
| 7 | 7 | 07 | 0000 0111 | BEL (bell) |
| 8 | 10 | 08 | 0000 1000 | BS (backspace) |
| 9 | 11 | 09 | 0000 1001 | HT (horizontal tab) |
| 10 | 12 | 0a | 0000 1010 | LF (line feed-new line) |
| 11 | 13 | 0b | 0000 1011 | VT (vertical tab) |
| 12 | 14 | 0c | 0000 1100 | FF (form feed-new page) |
| 13 | 15 | 0d | 0000 1101 | CR (carriage return) |
| 14 | 16 | 0e | 0000 1110 | SO (shift out) |
| 15 | 17 | 0f | 0000 1111 | SI (shift in) |
| 16 | 20 | 10 | 0001 0000 | DLE (data link escape) |
| 17 | 21 | 11 | 0001 0001 | DC1 (device control 1) |
| 18 | 22 | 12 | 0001 0010 | DC2 (device control 2) |
| 19 | 23 | 13 | 0001 0011 | DC3 (device control 3) |
| 20 | 24 | 14 | 0001 0100 | DC4 (device control 4) |
| 21 | 25 | 15 | 0001 0101 | NAK (negative acknowledge) |
| 22 | 26 | 16 | 0001 0110 | SYN (synchronous idle) |
| 23 | 27 | 17 | 0001 0111 | ETB (end of transmission block) |
| 24 | 30 | 18 | 0001 1000 | CAN (cancel) |
| 25 | 31 | 19 | 0001 1001 | EM (end of medium) |
| 26 | 32 | 1a | 0001 1010 | SUB (substitute) |
| 27 | 33 | 1b | 0001 1011 | ESC (escape) |
| 28 | 34 | 1c | 0001 1100 | FS (file separator) |
| 29 | 35 | 1d | 0001 1101 | GS (group separator) |
| 30 | 36 | 1e | 0001 1110 | RS (record separator) |
| 31 | 37 | 1f | 0001 1111 | US (unit separator) |
| 32 | 40 | 20 | 0010 0000 | (space) |
| 33 | 41 | 21 | 0010 0001 | ! |
| 34 | 42 | 22 | 0010 0010 | " |
| 35 | 43 | 23 | 0010 0011 | # |
| 36 | 44 | 24 | 0010 0100 | $ |
| 37 | 45 | 25 | 0010 0101 | % |
| 38 | 46 | 26 | 0010 0110 | & |
| 39 | 47 | 27 | 0010 0111 | ' |
| 40 | 50 | 28 | 0010 1000 | ( |
| 41 | 51 | 29 | 0010 1001 | ) |
| 42 | 52 | 2a | 0010 1010 | * |
| 43 | 53 | 2b | 0010 1011 | + |
| 44 | 54 | 2c | 0010 1100 | , |
| 45 | 55 | 2d | 0010 1101 | - |
| 46 | 56 | 2e | 0010 1110 | . |
| 47 | 57 | 2f | 0010 1111 | / |
| 48 | 60 | 30 | 0011 0000 | 0 |
| 49 | 61 | 31 | 0011 0001 | 1 |
| 50 | 62 | 32 | 0011 0010 | 2 |
| 51 | 63 | 33 | 0011 0011 | 3 |
| 52 | 64 | 34 | 0011 0100 | 4 |
| 53 | 65 | 35 | 0011 0101 | 5 |
| 54 | 66 | 36 | 0011 0110 | 6 |
| 55 | 67 | 37 | 0011 0111 | 7 |
| 56 | 70 | 38 | 0011 1000 | 8 |
| 57 | 71 | 39 | 0011 1001 | 9 |
| 58 | 72 | 3a | 0011 1010 | : |
| 59 | 73 | 3b | 0011 1011 | ; |
| 60 | 74 | 3c | 0011 1100 | < |
| 61 | 75 | 3d | 0011 1101 | = |
| 62 | 76 | 3e | 0011 1110 | > |
| 63 | 77 | 3f | 0011 1111 | ? |
| 64 | 100 | 40 | 0100 0000 | @ |
| 65 | 101 | 41 | 0100 0001 | A |
| 66 | 102 | 42 | 0100 0010 | B |
| 67 | 103 | 43 | 0100 0011 | C |
| 68 | 104 | 44 | 0100 0100 | D |
| 69 | 105 | 45 | 0100 0101 | E |
| 70 | 106 | 46 | 0100 0110 | F |
| 71 | 107 | 47 | 0100 0111 | G |
| 72 | 110 | 48 | 0100 1000 | H |
| 73 | 111 | 49 | 0100 1001 | I |
| 74 | 112 | 4a | 0100 1010 | J |
| 75 | 113 | 4b | 0100 1011 | K |
| 76 | 114 | 4c | 0100 1100 | L |
| 77 | 115 | 4d | 0100 1101 | M |
| 78 | 116 | 4e | 0100 1110 | N |
| 79 | 117 | 4f | 0100 1111 | O |
| 80 | 120 | 50 | 0101 0000 | P |
| 81 | 121 | 51 | 0101 0001 | Q |
| 82 | 122 | 52 | 0101 0010 | R |
| 83 | 123 | 53 | 0101 0011 | S |
| 84 | 124 | 54 | 0101 0100 | T |
| 85 | 125 | 55 | 0101 0101 | U |
| 86 | 126 | 56 | 0101 0110 | V |
| 87 | 127 | 57 | 0101 0111 | W |
| 88 | 130 | 58 | 0101 1000 | X |
| 89 | 131 | 59 | 0101 1001 | Y |
| 90 | 132 | 5a | 0101 1010 | Z |
| 91 | 133 | 5b | 0101 1011 | [ |
| 92 | 134 | 5c | 0101 1100 | \ |
| 93 | 135 | 5d | 0101 1101 | ] |
| 94 | 136 | 5e | 0101 1110 | ^ |
| 95 | 137 | 5f | 0101 1111 | _ |
| 96 | 140 | 60 | 0110 0000 | ` |
| 97 | 141 | 61 | 0110 0001 | a |
| 98 | 142 | 62 | 0110 0010 | b |
| 99 | 143 | 63 | 0110 0011 | c |
| 100 | 144 | 64 | 0110 0100 | d |
| 101 | 145 | 65 | 0110 0101 | e |
| 102 | 146 | 66 | 0110 0110 | f |
| 103 | 147 | 67 | 0110 0111 | g |
| 104 | 150 | 68 | 0110 1000 | h |
| 105 | 151 | 69 | 0110 1001 | i |
| 106 | 152 | 6a | 0110 1010 | j |
| 107 | 153 | 6b | 0110 1011 | k |
| 108 | 154 | 6c | 0110 1100 | l |
| 109 | 155 | 6d | 0110 1101 | m |
| 110 | 156 | 6e | 0110 1110 | n |
| 111 | 157 | 6f | 0110 1111 | o |
| 112 | 160 | 70 | 0111 0000 | p |
| 113 | 161 | 71 | 0111 0001 | q |
| 114 | 162 | 72 | 0111 0010 | r |
| 115 | 163 | 73 | 0111 0011 | s |
| 116 | 164 | 74 | 0111 0100 | t |
| 117 | 165 | 75 | 0111 0101 | u |
| 118 | 166 | 76 | 0111 0110 | v |
| 119 | 167 | 77 | 0111 0111 | w |
| 120 | 170 | 78 | 0111 1000 | x |
| 121 | 171 | 79 | 0111 1001 | y |
| 122 | 172 | 7a | 0111 1010 | z |
| 123 | 173 | 7b | 0111 1011 | { |
| 124 | 174 | 7c | 0111 1100 | | |
| 125 | 175 | 7d | 0111 1101 | } |
| 126 | 176 | 7e | 0111 1110 | ~ |
| 127 | 177 | 7f | 0111 1111 | DEL (delete) |

As can be seen from the above table, the most significant bit for all of the encodings is the same, 0. The disclosed embodiments recognize that strings of characters using only the English alphabet and/or roman numerals, and which may form English language words, may be exclusively encoded using ASCII. Accordingly, the disclosed embodiment further recognize that storing such strings using only 7 bits per character, as opposed to a full byte/8 bits, can save a significant amount of memory, e.g., 12.5% per character. As will be discussed, the disclosed embodiments further recognize that the English alphabet and English language is relatively static, e.g., new letters will not be added to the English alphabet anytime soon, that most computers store human readable information, including program code, in the English language and that, statistically, a majority of English language words are nine (9) or less characters in length, and given the relatively static nature of the language, this is unlikely to change.

When storing data in a memory, programming languages and applications typically define organized arrangements of the data to be stored, e.g., data structures and databases, which help to contextualize or otherwise define the meaning of the stored data and facilitate identifying, locating and retrieving particular data when needed.

One such data structure is a hashmap, also referred to as a hash table, which uses a table of numeric hashes, referred to as a hash table, in concert with separately stored data items to create a readily searchable/accessible database. Generally, a hash table (hash map) is a data structure, i.e., a form of key-value database, that implements an associative array abstract data type, i.e., a structure that can map keys, such as identifiers unique to one or more data items, to values, such as addressable locations in a memory where those particular items of data may be found if they are stored in the memory. A hash table uses a hash function to compute, based on the data (key) to be retrieved, an index, also called a hash code, into an array of buckets or slots, from which the desired value, e.g., memory address, can be found. During the lookup, the key is hashed and the resulting hash indicates where the corresponding value (address) is stored. Accordingly, a hashmap has two parts stored in the memory, a hash table which stores data representative of the hashes/keys and values (addresses), and the actual data stored in the memory at the addressable locations indicated by the hashmap. When one wants to find a particular piece data, they first access the hashmap to identify the address where that data is located and then, using that identified address, they retrieve the desired data from the memory. While hash maps provide a very effective mechanism for storing and retrieving data, especially a large volume of data that may be periodically updated/modified, they may require at least two memory operations every time one wishes to retrieve data therefrom. In a typical computer system, the operations to retrieve single piece of data may take around 100 ns.

As noted, a hash table is an example of a key-value database. A key-value database, or key-value store, is a data storage paradigm designed for storing, retrieving, and managing associative arrays. In computer science, an associative array, map, symbol table, or dictionary is an abstract data type composed of a collection of (key, value) pairs, such that each possible key (or key hierarchy) appears at most once in the collection. Dictionaries contain a collection of objects, or records, which in turn have many different fields within them, each containing data. These records are stored and retrieved using a key that uniquely identifies the record, and is used to find the data within the database.

Key-value databases work in a very different fashion from the better known relational databases (RDB). RDBs pre-define the data structure in the database as a series of tables containing fields with well-defined data types. Exposing the data types to the database program allows it to apply a number of optimizations. In contrast, key-value systems treat the data as a single opaque collection, which may have different fields for every record. This offers considerable flexibility and more closely follows modern concepts like object-oriented programming. Because optional values are not represented by placeholders or input parameters, as in most RDBs, key-value databases often use far less memory to store the same database, which can lead to large performance gains in certain workloads.

In a hierarchical key-value database, a value of a given key may be another key. This permits the key-value database/store to store/represent nested or hierarchical data, such as a set of home addresses or multiple address book entries, etc. or other complex data sets.

A key-value store, or key-value database, is a type of data storage software program that stores data as a set of unique identifiers, each of which have an associated value. This data pairing is known as a "key-value pair." The unique identifier is the "key" for an item of data, and a value is either the data being identified or the location of that data. The key could be anything, depending on restrictions imposed by the database software, but it should be unique in the database so there is no ambiguity when searching for the key and its value. The value could be anything, including a list or another key-value pair. Some database software allows you to specify a data type for the value. In some implementations, the values are stored without the keys and separate "schema" is used to define the arrangement of the stored values and their associated keys. This is similar to a hashmap may reduce the amount of required storage by eliminating the storage of redundant keys but then requires two lookups to retrieve a value, one to the schema and then one to the store values. Alternatively, the keys and associated values may be stored together. This may require more storage as a given key may be stored more than once but, as will be described, enables using a single get/lookup operation to retrieve a particular value, resulting in improved performance.

In traditional relational database design, data is stored in one or more tables, each composed of rows and columns. The database developer specifies many attributes of the data to be stored in the table upfront. This creates significant opportunities for optimizations such as data compression and performance around aggregations and data access, but also introduces some inflexibility.

Key-value stores, on the other hand, are typically much more flexible and offer very fast performance for reads and writes, in part because the database is looking for a single key and is returning its associated value rather than performing complex aggregations. A key-value pair is two pieces of data associated with each other. The key is a unique identifier that points to its associated value, and a value is either the data being identified or a pointer to that data, such as in a hash table or hash map. A key-value pair is the fundamental data structure of a key-value store or a key-value database, but key-value pairs have existed outside of software for much longer. A telephone directory is a good example, where the key is the person or business name, and the value is the phone number. Stock trading data is another example of a key-value pair. In this case, you may have a key associated with values for the stock ticker, whether the trade was a buy or sell, the number of shares, or the price of the trade.

There are a few advantages that a key-value store provides over traditional row-column-based databases. Thanks to the simple data format that gives it its name, a key-value store can be very fast for read and write operations. And key-value stores are very flexible, a valued asset in modern programming as more data is generated without traditional structures. Also, key-value stores do not require placeholders such as "null" for optional values, so they may have smaller storage requirements, and they often scale almost linearly with the number of nodes. The advantages listed above naturally lend themselves to several popular use cases for key-value databases. Web applications may store user session details and preference in a key-value store. All the information is accessible via a user key, and key-value stores lend themselves to fast reads and writes. Real-time recommendations and advertising are often powered by key-value stores because the stores can quickly access and present new recommendations or ads as a web visitor moves throughout a site. On the technical side, key-value stores are commonly used for in-memory data caching to speed up applications by minimizing reads and writes to slower disk-based systems. Hazelcast is an example of a technology that provides an in-memory key-value store for fast data retrieval.

An in-memory database (IMDB) is a computer system that stores and retrieves data records that reside in a computer's main memory, e.g., random-access memory (RAM). With data in RAM, IMDBs have a speed advantage over traditional disk-based databases that incur access delays since storage media like hard disk drives and solid-state drives (SSD) have significantly slower access times than RAM. This means that IMDBs are useful for when fast reads and writes of data are crucial.

Examples of data storage formats which use key-value pairs are XML and JSON which use human-readable keys, referred to as tags, and data values associated with those tags. As was noted above, it is typical that both the tags/keys and their associated values are formed of English alphabet characters and/or European numerals.

In one embodiment, the disclosed system is used to generate a compact in memory key-value data structure/database which may or may not be hierarchical, i.e., include nested key-value data structures, which can be utilized for other applications. The key-value data to be stored in the generated database may be extracted from another database, such as a relational database, or other source. For example, the data to be stored may comprise a particular view of, or result of a query from, a relational database. It will be appreciated that the disclosed embodiments may be used to encode and store any data, not just key-value data sets, which would benefit from the compact long-aligned form generated thereby.

In one embodiment, the generated data structure is constructed as a set/array of longs, the fundamental/minimal unit of data, addressable on a long boundary and referred to as a Direct Access Map (DAM) as it may be accessed to retrieve data, as will be described, using singular data retrieval/memory access operations (as opposed to indexed data structures which provide for indirect access using a separate index data structure and at least two data retrieval operations). Further, each nested data structure therein may also be referred to as a DAM.

Generally, the disclosed DAM may be used to replace any flat, nested and/or associative data structure, such as a comma separated variable (CSV) data structure, HTML, XML or JSON data, a view or extraction of an RDB, etc. Multiple separate DAM's may be generated, e.g., each comprising a different data set or different view/extraction from an RDB, and stored in the memory to provide additional data access functionality. The disclosed embodiments may be used to efficiently store data, such as an in-memory database, in a cache memory.

In one implementation, the disclosed embodiments are implemented in the Java Map Interface, an object that maps keys to values and support get, put, delete and other method implementations. The disclosed embodiments provide the internal storage for this function.

Given an ordered key-value data set, e.g., a CSV data set or extraction from an RDB, to be converted to the disclosed in-memory data structure, the disclosed embodiments convert/encode, in the order of the data as provided, each key and each value (collectively referred to as primitives) to one or more 64 bit (1 long) binary representations, with the characters thereof encoded in the seven (7) bit ASCII form (referred to as compactification), arranged as an array, i.e., an array of longs, which form the main DAM.

The first bit (left most/most significant bit) of each 64 bit long indicates whether the remaining 63 bits contain a short string (9 or fewer characters) or another data type. More particularly, a first bit of 0 indicates a short string, i.e., a string that fits in a single long, including that first 0 bit where the remaining 63 bits, from left to right, e.g., most significant to least significant bits, contain up to 9 seven bit ASCII encoded characters. In a short string, no length is specified. For a short string, if less than 9 characters are encoded, the remaining unused bits are set to NUL values.

If the first bit is 1, then the next 7 bits define a data type specifying the type of data stored in the remaining bits of this first long as well as any additional successive longs as necessary to store all of the data, along with data indicating the total length, i.e., total number of longs used, including the first long. For a long string, also referred to as a string, i.e., greater than 9 characters, the first 3 bits, e.g., 101, specify the data type with the following 25 bits specifying the length (in longs including this first long, non-zero length not allowed), followed by one unused bit. The remaining 35 bits store the first 5 characters of the string, i.e., in 7 bit ASCII as described.

Where the data type is an array type or indicates an embedded DAM (referred to as a String Map), the next 24 bits following the 8 bit preamble specify a non-zero length, i.e., the total number of 64 bit longs, not including this first one, in which the data, i.e., the array of longs, is stored in, followed by an 8 bit length of the original array (the length of the unencoded array and presently unused by the disclosed embodiments), with the remaining 24 bits being unused. For a string map, the 8 bit preamble is followed by a 24 bit length with the remaining 32 bits of the long being unused. For the other non-short string, non-array data types, the remaining 56 bits store the actual data. It will be appreciated that the length fields could alternatively be defined such that a zero value is allowed and represents a length of one long. In one embodiment, the entire data structure is a DAM and is therefore preceded by a String Map data type identifier as shown below.

One example set of possible data encodings/data-types supported by the disclosed embodiments are shown in the following table:

| Data Type | 64 Bit Long (in Hexadecimal) | | First 8 Bits/Preamble | |
|---|---|---|---|---|
| SHORT_STRING = | 0x0000000000000000L; | // | 0xxx | xxxx |
| PSEUDO_DOUBLE = | 0x8000000000000000L; | // | 1000 | 0000 (0x80) |
| PSEUDO_LONG = | 0xC000000000000000L; | // | 1100 | 0000 (0xC0) |
| STRING = | 0xA000000000000000L; | // | 1010 | 0000 (0xA0) |
| BYTE = | 0xF100000000000000L; | // | 1111 | 0001 (0xF1) |
| CHAR = | 0xE100000000000000L; | // | 1110 | 0001 (0xE1) |
| SHORT = | 0xE200000000000000L; | // | 1110 | 0010 (0xE2) |
| INTEGER = | 0xE300000000000000L; | // | 1110 | 0011 (0xE3) |
| LONG = | 0xE400000000000000L; | // | 1110 | 0100 (0xE4) |

-continued

| Data Type | 64 Bit Long (in Hexadecimal) | | First 8 Bits/Preamble | | |
|---|---|---|---|---|---|
| FLOAT = | 0xE500000000000000L; | // | 1110 | 0101 | (0xE5) |
| DOUBLE = | 0xE600000000000000L; | // | 1110 | 0110 | (0xE6) |
| BOOLEAN = | 0xE700000000000000L; | // | 1110 | 0111 | (0xE7) |
| STRING_ARRAY = | 0xE800000000000000L; | // | 1110 | 1000 | (0xE8) |
| BYTE_ARRAY = | 0xE900000000000000L; | // | 1110 | 1001 | (0xE9) |
| CHAR_ARRAY = | 0xEA00000000000000L; | // | 1110 | 1010 | (0xEA) |
| SHORT_ARRAY = | 0xEB00000000000000L; | // | 1110 | 1011 | (0xEB) |
| INTEGER_ARRAY = | 0xEC00000000000000L; | // | 1110 | 1100 | (0xEC) |
| LONG_ARRAY = | 0xED00000000000000L; | // | 1110 | 1101 | (0xED) |
| FLOAT_ARRAY = | 0xEE00000000000000L; | // | 1110 | 1110 | (0xEE) |
| DOUBLE_ARRAY = | 0xEF00000000000000L; | // | 1110 | 1111 | (0xEF) |
| BOOL_ARRAY = | 0xF000000000000000L; | // | 1111 | 0000 | (0xF0) |
| UTF8_STRING = | 0xF400000000000000L; | // | 1111 | 0100 | (0xF4) |
| OBJECT = | 0xF200000000000000L; | // | 1111 | 0010 | (0xF2) |
| STRING_MAP = | 0xF300000000000000L: | // | 1111 | 0011 | (0xF3) |

In the above table, 0's following the data type shown in the hexadecimal representation show where encoded data would be stored. As noted above, the preamble for some data types, e.g. strings is less than 8 bits, e.g., for strings it is 3 bits.

The following is an example of the operation of the disclosed embodiments on a sample key-value data structure, shown below, the keys, also referred to as tags (opening tags and closing tags), being depicted between "<" and ">" symbols, with closing tags indicated by a preceding "/":

```
<person>
   <name>John Doe</name>
   <id>123456</id>
   <dob>12345677891837</dob>
   <address>
      <type>Business</type>
      <street>1 State st</street>
      <city>Chicago</city>
      <state>IL</state>
      <country>USA</country>
   </address>
   <address>
      <type>Home</type>
      <street>1 Main st</street>
      <city>Elgin</city>
      <state>IL</state>
      <country>USA</country>
   </address>
   <employer>
      <name>ABC Corp</name>
      <taxId>11122233334444</taxId>
      <phone>
         <type>fax</type>
         <number>3123120000</number>
      </phone>
      <phone>
         <type>reg</type>
         <number>3123120001</number>
      </phone>
   </employer>
</person>
```

As will be appreciated, the above data includes two different addresses for the identified person and two different phone numbers for the specified employer and may be an example of a typical data record extracted from a contacts or address book database.

Exclusive of the <, >, / and closing tag text, which the disclosed embodiments may ignore as redundant data, the above sample has 504 characters in 44 strings. The strings (primitives) to be converted/encoded are:

person
name
John Doe
id
123456
dob
12345677891837
address
type
Business
street
1 State St
city
Chicago
state
IL
country
USA
address
type
Home
street
1 Main st
city
Chicago
state
IL
country
USA
employer
name
ABC Corp
taxId
11122233334444
phone
type
fax
number
3123120000
phone
type
reg
number
3123120001

As will be described, these 44 strings include five strings that are larger than 9 symbols/characters, each requiring two 64 bit encodings according to at least one of the disclosed embodiments, and there are six embedded/nested data structures (DAM's) (including the main DAM/data structure), i.e., 1 person (the main DAM/data structure) along with 2 address, 1 employer and 2 phone nested/embedded DAM's/data structures.

Accordingly, using the disclosed embodiments, this will require 55 64-bit (8 byte) encodings for a total data size of 440 bytes. It will be appreciated that storing the above data structure as a simple string (of approximately 504 characters (509 with spaces) with closing tags and slashes) would require up to approximately 1000 bytes. For example, each string consumes 8*(int) (chars*2+45/8) bytes or, for 504 characters, =>8*(int) (504*2+45/8)=1056 bytes. Similarly, using a hash map to store the above data structure would require approximately 1600 bytes as the keys and values are broken down into smaller strings, e.g., the string "person", as the key in the hashmap, would require 64 bytes. As can be seen, the disclosed embodiments, using only 440 bytes, are approximately 56% more efficient at storing the strings alone and approximately 72% more efficient at storing a hashmap and the strings.

Each string is converted/encoded according to the disclosed process, e.g., encoding one character at a time by bitwise shifting the character by 7 and then bitwise OR'ing with the current long being constructed or performing a bitwise left shift of length value and then doing a bitwise OR with the data type preamble to give the first 28 bits of the header. For example, the first string is "person" which, when converted to 7 bit ASCII, as per the chart shown above, is (in hexadecimal):

x70(p) x65(e) x72(r) x73(s) x6F(o) x6E(n)

To construct the disclosed representation/encoding, it is first noted that the string "person" includes only 6 symbols/letters and therefore can fit within the example word size of 64 bits (one long) also referred to as a "short string" data type, which as noted elsewhere, can hold up to nine seven-bit ASCII characters. The first bit is set to 0, as specified in the data type table provided above, to indicate that this is a "short" string that fits within one long. Arranging the remaining bits yields:

| 0-1110000-1100101-1110010-1110011-1101111-1101110- . . . | | | | | | | | | | |
|---|---|---|---|---|---|---|---|---|---|---|
| 7 | 0 | 6 | 5 | 7 | 2 | 7 | 3 | 6 | F | 6 E |
| p | | e | | r | | s | | o | | n |
| . . . 0000000-0000000-0000000 | | | | | | | | | | |
| 0 | 0 | 0 | 0 | 0 | 0 | | | | | |
| NUL | | NUL | | NUL | | | | | | |

When this binary value is converted to decimal, it results in a value of 8127813836242681856.

As the string "person" is an opening tag, and the highest/outer-most key in the hierarchy of the sample data structure, and it is followed by another opening tag, the string "name", which indicates an embedded/nested data structure (between the successive opening tag (name) and its closing tag (/name), e.g., a DAM, the disclosed system inserts the following encoded value to indicate this nested data structure, which, in the example, is the primary data structure being encoded, e.g. "person":

64 Bit Binary Encoding: 1111-0011-0000-0000-0000-0000-0011-0101-0000-0000-0000-0000-0000-0000-0000-0000

Decimal: 17509995583144722432

Signed 2's complement*: −936748490564829184

(signed 2's complement is a representation used to represent signed binary numbers, i.e., where the most significant bit represents the sign (positive or negative) of the value).

This data/encoding indicates that the following data is a nested data structure, i.e., a String Map, also noted as a DAM, and provides the length thereof in terms of the number of longs in the embedded DAM, not including this indicator, e.g., 53 (as noted above, the entire sample data structure is 55 longs. Deducting the first string "person" and this DAM/String Map indicator, 53 longs remain). In particular: Data type F3 (1111-0011) indicates an embedded DAM (string map) and the length of the DAM, i.e., 53 longs—this allows a program to skip the entire DAM if, e.g., the preceding key did not match a search query.

The next string is "name":

ASCII: x6E(n) x61(a) x6D(m) x65(e)

64 Bit Binary Encoding: 0-1101110-1100001-1101101-1100101-0000000-0000000-0000000-0000000-0000000

Decimal Value: 7981424347057225728

The next string is "john doe"

ASCII: x4A(j) x6F(o) x68(h) x6E(n) x20(<SPC>) x44(d) x6F(o) x65(e)

64 Bit Binary Encoding: 0-1001010-1101111-1101000-1101110-0100000-1000100-1101111-1100101-0000000

Decimal Value: 5395210588779180672

The next string is "id":

ASCII: x69(i) x64(d)

64 Bit Binary Encoding: 0-1101001-1100100-0000000-0000000-0000000-0000000-0000000-0000000-0000000

Decimal Value: 7622342369324564480

The next string is "123456":

ASCII: x31(1) x32(2) x33(3) x34(4) x35(5) x36(6)

64 Bit Binary Encoding: 0-1101001-1100100-0000000-0000000-0000000-0000000-0000000-0000000-0000000

Decimal Value: 3559195706948321280

The next string is "dob":

ASCII: x64(d) x6F(o) x62(b)

64 Bit Binary Encoding: 0-1100100-1101111-1100010-0000000-0000000-0000000-0000000-0000000-0000000

Decimal Value: 7268677857180647424

The next string is "12345677891837" which is 14 symbols/characters and therefore will not fit in one single 64 bit long. Accordingly, it is encoded as two longs where the first long indicates that the string is larger than one long and provides the total length, in longs, e.g., 2. Accounting for the bits which indicate the data type and the bits which indicate the length, there are 35 remaining bits allowing this long to store the first 5 symbols of the string, with the remaining symbols of the being encoded right to left in groups of 9 symbols in the remaining longs in turn. Accordingly, in addition, this first long stores the first 5 symbols/digits of the string: "12345" (the right most 9 symbols to be encoded in the next/last long):

ASCII: 3 bit preamble (101)+25 bit length (2)+1 unused bit+x31(1) x32(2) x33(3) x34(4) x35(5)

64 Bit Binary Encoding: 101-0-0000-0000-0000-0000-0000-0010-0-0110001-0110010-0110011-0110100-0110101
Decimal Value: 11529215196766460469
Signed 2's Complement: −6917528876943091147
The remainder of the string, e.g. "677891837" is encoded as:
  ASCII: x36(6) x37(7) x37(7) x38(8) x39(9) x31(1) x38(8) x33(3) x37(7)
  64 Bit Binary Encoding: 0-0110110-0110111-0110111-0111000-0111001-0110001-0111000-0110011-0110111
  Decimal Value: 3922316157594245559
  The next string is "address":
  ASCII: x61(a) x64(d) x64(d) x72(r) x65(e) x73(s) x73(s)
  64 Bit Binary Encoding: 0-1100001-1100100-1100100-1110010-1100101-1110011-1110011-0000000-0000000
  Decimal Value: 7046325366037463040
As the key (opening tag) value "address" is followed by the key (opening tag) value "type", this indicates a nested/embedded data structure and the disclosed system inserts an indicator thereof, including the length, e.g., 12 (note below that there is one value in this data structure ("1 State st") that requires two longs to store):
  64 Bit Binary Encoding: 1111-0011-0000-0000-0000-0000-0000-0011-0000-0000-0000-0000-0000-0000-0000-0000
  Decimal 1094374710256336896
  Signed 2's complement: −936748709608161280
  The next string is "type":
  ASCII: x74(t) x79(y) x70(p) x65(e)
  64 Bit Binary Encoding: 0-1110100-1111001-1110000-1100101-0000000-0000000-0000000-0000000
  Decimal Value: 8427293904306438144
  The next string is "business":
  ASCII: x62(b) x75(u) x73(s) x69(i) x6E(n) x65(e) x73(s) x73(s)
  64 Bit Binary Encoding: 0-1100010-1110101-1110011-1101001-1101110-1100101-1110011-1110011-0000000
  Decimal Value: 7128018773130148224
  The next string is "street":
  ASCII: x73(s) x74(t) x72(r) x65(e) x65(e) x74(t)
  64 Bit Binary Encoding: 0-1110011-1110100-1110010-1100101-1100101-1110100-0000000-0000000-0000000
  Decimal Value: 8352430383949676544
The next string is " 1 State St" which is 10 symbols/characters and therefore will not fit in one single 64 bit long. Accordingly, it is encoded as two longs where the first long indicates that the string is larger than one long and provides the total length, in longs, e.g., 2. In addition, this first long stores the first 5 symbols/digits of the string: "1 Sta":
  ASCII: 3 bit preamble (101)+25 bit length (2)+1 unused bit+x31(1) x20(SPC) x53(S) x74(t) x61(a)
  64 Bit Binary Encoding: 101-0-0000-0000-0000-0000-0000-0010-0-0110001-0100000-1010011-1110100-1100001
  Decimal Value: 11529215196729244257
  Signed 2's Complement: −6917528876980307359
  The remainder of the string, e.g. "the st" is encoded as:
  ASCII: x74(t) x65(e) x20(<SPC>) x73(s) x74(t)
  64 Bit Binary Encoding: 0-1110100-1100101-0100000-1110011-1110100-0000000-0000000-0000000

Decimal Value: 8415683573691973632
The next string is "city":
ASCII: x63(c) x69(i) x74(t) x79(y)
64 Bit Binary Encoding: 0-1100011-1101001-1110100-1111001-0000000-0000000-0000000-0000000
Decimal Value: 7193325885787734016
The remaining strings are similarly encoded in 64 bit longs as follows (only decimal values are provided) ("DAM" indicates a nested structure as specified by at least two consecutive opening tag values):
  chicago=4886870818450817024
  state=8352356132311793664
  il=5302988561228759040
  country=7196707636977221632
  USA=6171906212381065216
  address=7046325366037463040
  DAM=−936748675248422912
  type=8427293904306438144
  Home=5251117072963862528
  street=8352430383949676544
  1 Main St=3549178517260876276
  city=7193325885787734016
  Elgin=5033229219677601792
  state=8352356132311793664
  IL=5302988561228759040
  country=7196707636977221632
  USA=6171906212381065216
  employer=7339674864866392320
  DAM=−936748636593717248
  name=7981424347057225728
  ABC Corp=4721194096238835712
  taxId=8413817354567286784
  11122=−6917528876945221326
  233334444=3631816216039725620
  phone=8129489317249679360
  DAM=−936748696723259392
  type=8427293904306438144
  fax=7405008502931849216
  number=7992683270397493248
  31231=−6917528876408333903
  20000=3630114068045496320
  phone=8129489317249679360
  DAM=−936748696723259392
  type=8427293904306438144
  reg=8271876664409980928
  number=7992683270397493248
  31231=−6917528876408333903
  20001=3630114068313931776
Once encoded, the 55 64 bit data values may be stored in a contiguous block of memory, e.g., in an array of 55 contiguous locations in the cache memory, referred to as an "array of longs." Storing the encoded values together in this manner may further avoid memory fragmentation. Particular data may then be directly accessed by a processor/computer program using a single operation, e.g., using the dot notation/protocol described below. It will be appreciated that using the given encoding mechanism, a processor may retrieve the data from each memory location, i.e., each long, using a single memory operation and may further compare the retrieved data with a comparison value using a single processor operation, e.g., a bit-wise compare operation. Such operations may take on the order of 2 ns for a typical 64 bit computer processor running at 32 GHz. Accordingly, despite the "brute force" nature of searching the entire data structure for particular data, such a search may, in fact, be executed much faster than searching for data using other data storage techniques/paradigms, e.g., a hashmap. For example, using a hashmap, just to retrieve data for comparison requires two memory operations, one operation to index into the hashmap and retrieve the memory location of the desired data and a second operation to actually retrieve that data, which as mentioned above may take around 100 ns for a typical 64 bit computer processor running at 32 GHz. Accordingly, not only does a hashmap consume more memory than the disclosed encoding method but is also slower for both direct access to particular data and for searching. That is, using the disclosed embodiments, approximately 50 memory locations can be searched in the same time that it takes to perform a single get operation using a hashmap. Accordingly, the performance of a DAM with less than 50 elements will always be better than a hashmap and will consume less memory. For larger DAM's where a search can be completed in less than 50 operations, the performance will similarly be better than a hashmap.

While the disclosed embodiments may be used to encode any type of data, such as just the values of key-value pairs (relying on a separate schema or other data to understand the values), storing the keys and values together supports the disclosed direct access, i.e., single get/lookup operation per retrieval from the encoded data. Further these operations can be performed very quickly, e.g., around 2 ns for a typical 64 bit computer processor running at 32 GHz. While this necessarily requires storing redundant keys which requires additional storage, as opposed to using a separate schema or index, the tradeoff for the extra storage is improved performance in reducing the number of lookup/get operations from two to one per retrieval.

For example, to search for a value associated with a particular key, an application or process may, starting at the first memory location at which the disclosed data structure is stored, iteratively retrieve the data stored at each location, which may be a key, a value associated with a key or an indicator of embedded data structure, compare that retrieved data against the key being searched for, and continue this process until the desired data is located or all of the locations have been inspected. Where the application/process is familiar with the data types defined above, it may be operative to intelligently skip over multiple memory locations used to store a single data (e.g., a key or value that does not fit within one long) item using the encoded length data provided by the data type encoding. Where the application/process is further programmed to understand the key/value structure of the stored data, it may further be operative to skip over entire nested data structures based on the encoded indicators which indicate both the existence of a nested data structure and the length (number of longs/memory locations) thereof, when it knows that a given nested key would not be found therein. For example, when searching for all employer phone numbers, the address data structures may be skipped. As noted, this functionality provides the direct access of the DAM.

Generally, then, the disclosed embodiments may be used to enable in memory databases, in memory data caches, in memory translation/transformation/mapping tables, etc. for use in/by various applications/processes.

For example, the disclosed embodiments may be used to implement a mapping function which translate/transform one value (the key) into another value (the value associated with that key). Hierarchical/nested mappings are readily supported. For example, the following data structure may be defined and encoded in accordance with the disclosed embodiments:

<characters>
  <letters>
    <vowels>
      <A>1</A>
      <B>2</B>
      <I>3</I>
      <0>4</0>
      <U>5</U>
      <Y>6</Y>
    </vowels>
    <consonants>
      <B>7</B>
      <C>8</C>
      <D>9</D>
      <F>10</F>
      <G>11</G>
      <H>12</H>
      <J>13</J>
      <K>14</K>
      <L>15</L>
      <M>16</M>
      <N>17</N>
      <P>18</P>
      <Q>19</Q>
      <R>20</R>
      <S>21</S>
      <T>22</T>
      <V>23</V>
      <W>24</W>
      <X>25</X>
      <Z>26</Z>
    </consonants>
  </letters>
</characters>

This data structure may then be encoded and used to map/translate letters to numeric values, e.g., to map N to 17, A to 1, Z to 26, etc., by looking up a given letter (key) and retrieving the associated value. To change this mapping, e.g., to map A to 26 and Z to 1, or to add additional mappings, such as numbers to letters, one need only modify the data stored in the data structure. For example, a program may be implemented to read a string of characters one at a time, access the encoded mapping table to translate each of those characters and output the result thereof. Such a program could be readily updated to handle different characters or different mappings by updating the encoded data structure. A similar mapping table may be used to transform one database into another, e.g., another form.

As opposed to translation, the data structure could represent rules by which data is evaluated to determine its validity. For example, using the above example data structure, an input to an interface may be configured to accept only letters and not numbers as input. As each character is entered into the interface, it is checked against the data structure and if a number if returned, the inputted character is accepted and if no number is returned, because the inputted character is not found in the data structure, the inputted character is rejected. This construct may be used to implement rules or constraints, such a data types, minimum or maximum values, specific acceptable values, etc. In one embodiment, data may be extracted from a database and encoded and stored in accordance with the disclosed embodiments wherein this encoded data may then be used for comparing against inputted data to determine, for example, if the inputted data exists in the database, e.g., to prevent duplicate data from being stored in the database.

The above described memory encoding/compaction process may be used by a natural language processing (NLP) system/application to create an in memory database for processing data comprising natural language words and word combinations, e.g., English phrases or statements, so as to determine contextual information with respect thereto. Using the disclosed embodiments, an in memory database may be created using common (or application/domain specific) English or other language words as keys with contextual data as values associated therewith. Different keys may have the same associated value enabling the parsing of synonyms and equivalent words. An NLP application/process may then process a set of natural language inputs, e.g., phrases or statements, looking up each word in the in memory database to determine an appropriate context. For example, the word "tomorrow" may be a key associated with a value which instructs the processor to compute a date that is one day after the current date. By using nested data structures, as described, word combinations, such as phrases, may be discerned and evaluated. For example, a key comprising the word "next" may be followed by keys comprising "day," "week," "month," and "year" enabling the NLP application to discern the phrases "next day", "next week", "next month" or "next year". Keys associated with null values may allow the NLP process to ignore particular words, e.g., filler words.

Such an NLP process may be used to process inputs to another application, enabling a user to use natural language phrasing as an input thereto.

For example, an NLP process using a data structure encoded and stored in accordance with the disclosed embodiments may be used to process user inputs to a user interface, such as a web based interface, and convert those inputs into commands to another process, such as a query to a database or other interactions with a back-end system. In such a system, to enable/adapt the user interface to accept new/different commands, one need only update/modify the encoded data structure, avoiding having to modify the user interface itself.

As discussed above, the disclosed encoded data structure may be efficiently searched for particular data. For direct lookups where the data for a particular key (or key hierarchy) is to be retrieved, the data may be retrieved using a single get/lookup operation based on the memory address at which the data is stored. To facilitate such direct access, a query notation, syntax or protocol may be implemented, referred to herein as a dot notation, by an application/process/program which utilizes the disclosed encoded data structure or acts as an intermediary process/program, e.g., driver, between the disclosed encoded data structures and the applications/programs which need to access them.

This notation or syntax may provide for simple specification of the key or key hierarchy for which a value is to be retrieved, where each specified key of a given hierarchy is separated by a dot/period (".") and a numeric indicator may be used when there is more than one value located at the specified hierarchical level, e.g. key1.key2.key3[n].

person.name="John Doe"
    person.id=123456
    person.address[1].type="Business"

The specification may be preceded by a command, e.g. get or dam.get. For example:

dam.get("person.id")=123456;
    dam.get("person.address")=Map of address
    dam.get("person.address[1].city")=Chicago
    dam.get("person.employer.phone[1].type")=Fax A program, application or process may be configured to receive queries formed in this syntax and convert those queries to memory retrieval operations which specify a particular memory address, e.g., as a base address for the first location of the stored encoded data structure and an offset value from that base. In one implementation, the disclosed embodiments are implemented in the Java Map Interface, an object that maps keys to values and support get, put, delete and other method implementations. The disclosed embodiments provide the internal storage for this function. It will be appreciated that a program or process which uses the disclosed encoded data structures may be specifically configured to create and/or interact with those data structure as described herein.

It will be appreciated that multiple encoded data structures may be created in accordance with the disclosed embodiments and stored/made available for use by an application, specifically configured to directly interact with the encoded data structures or via an intermediary process/program. For example, where an application requires access to multiple different data sets, each may be encoded into a DAM, stored in the memory and made available to the application. Multiple DAM's may further be used where an application needs to be able to search or otherwise retrieve data in different ways from the same data set. For example, the above example would allow an application to determine the address of a particular person, i.e., for a known person, what is their address. However, such a DAM may not permit a determination of who lives at a particular address, i.e., for a known address, what persons reside there. However, a separate DAM may be created, such as based on a query or extraction from a relational database, i.e., the same database from which the above example DAM was created, organized by addresses and the persons who reside there, thereby enabling the necessary query. While a relational database may support both queries natively, using the disclosed embodiments, despite requiring two separate encoded data structures, may still provide improved performance.

A set of one or more DAM's for use by an application may be referred to as a cache or an in memory database (IMDB).

In operation, a given application may specify the DAM's that it requires for operation upon startup, such as by interacting with the Java Map Interface modified in accordance with the disclosed embodiments. An encoding process, in accordance with the disclosed embodiments, makes the necessary queries to the specified data sources, e.g., RDB's, and encodes the results thereof as described. The encoded data structures are then stored in the memory, e.g., in the cache memory, and made available to the application to utilize during the operation thereof, e.g., using the described dot-notation/syntax via the Java Map Interface.

Generally, it will be appreciated that the disclosed data structure is optimized for read performance. However, the disclosed embodiments may further support the ability for a process/application to store data in a DAM. Where data is merely being replaced and the type and length of the new data is same or smaller than the existing data, a write operation may simply store the new data in place of the old data. However, where new data is of a larger size than the data it is replacing or new data needs to be inserted into an existing DAM, the array of longs which make up the DAM need to be restructured/resized, i.e., by performing a split and join operation. However such operations may be implemented using an Array Copy function, such as the Java Array Copy function, which are typically implemented at the memory level, i.e., as a Direct Memory Access (DMA) operation, which can be performed relatively quickly. Such operations are also typically implemented atomically ensuring that the operation is completed without risk of data corruption.

The disclosed technology addresses the need in the art for efficiently utilizing available memory/storage, e.g., maximizing the amount of data that can be stored in a minimal amount of electronic storage, particularly with respect to the cache memory(ies) proximate to a processor, as well as improving the performance/efficiency with which that data may be accessed. Specifically, the disclosed technology solves a problem that uniquely arises in the fields of computer technology where processor and application performance is dependent upon access to data, the form in which that data is stored and the performance of the memory/storage systems which store the data. For example, by encoding data as described herein into long arrays of 7 bit ASCII data, that data may be compacted so as to make efficient use of available storage/memory. Where that data represents a key-value data set, the encoding of the keys and associated values, including nested key/value pairs, enables searching and data retrieval with improved performance as compared to using other data structures. Thus, the disclosed solution is rooted in computer technology in order to overcome a problem specifically arising in the computer systems, such as those used by electronic trading systems and other applications. Indeed, the subject technology improves the functioning of the computer by allowing it to use fewer resources with improved performance.

The disclosed embodiments are drawn to systems and methods that include specific computing components, each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The operations of the computer system shown in FIG. 1, as described below, may be controlled by computer-executable instructions stored on a non-transitory computer-readable medium 104. For example, the exemplary computer system 100 may store computer-executable instructions for receiving data to be encoded and stored in the memory 104, e.g., cache memory 106, encoding and storing that data as described herein.

Numerous additional servers, computers, handheld devices, personal digital assistants, telephones and other devices may also be connected to the computer system 100. Moreover, one skilled in the art will appreciate that the topology shown in FIG. 1 is merely an example and that the components shown in FIG. 1 may include other components not shown, such as other storage devices, network connections, etc., \ and be connected by numerous alternative topologies.

Figure 2:
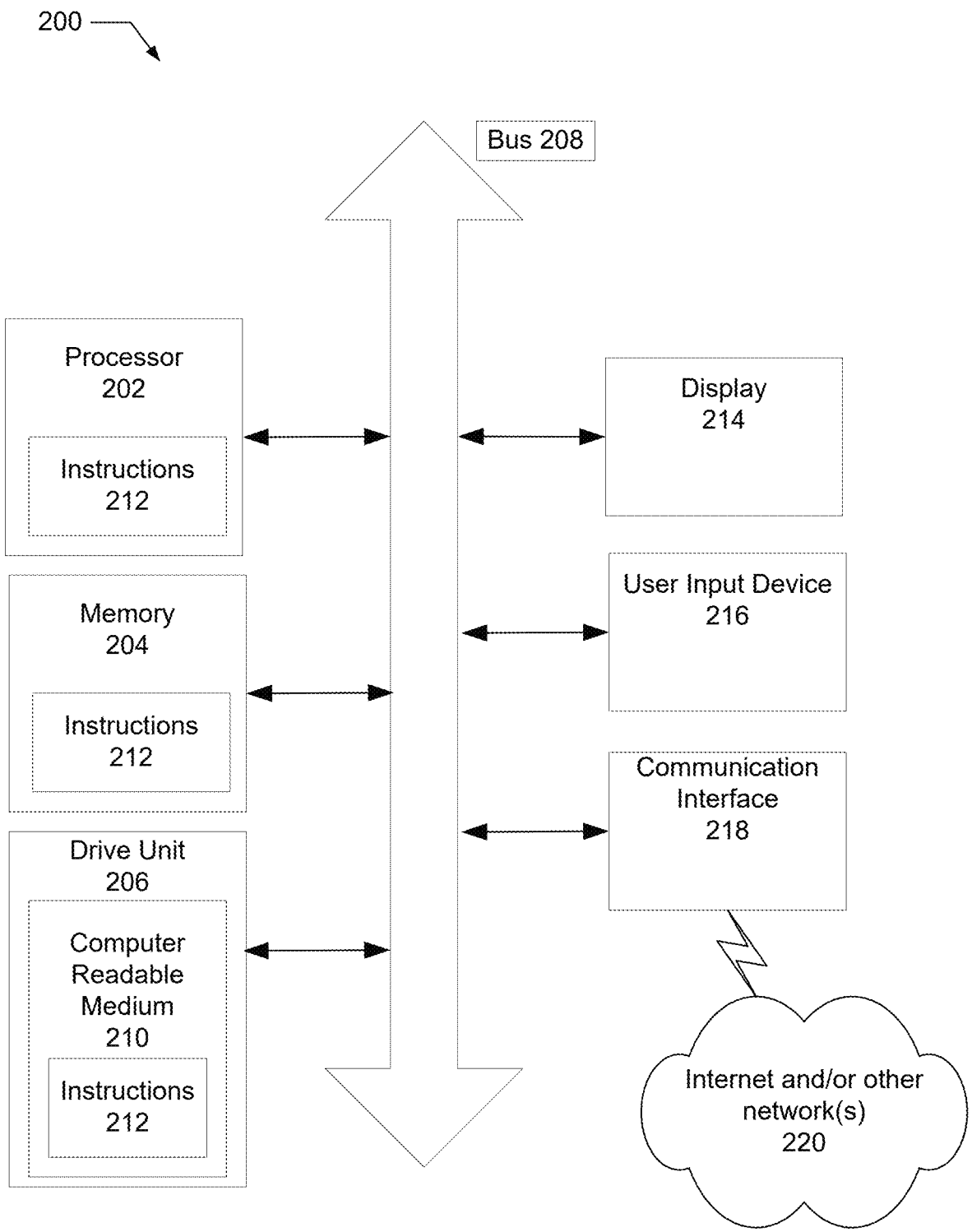
FIG. 2 depicts a general computer system, according to some embodiments.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

FIG. 1 depicts a block diagram of a system/apparatus 100 for storing, or otherwise optimizing storage of, data in a memory 104, such as a cache memory 106. It will be appreciated that the system 100 may be a part of an electronic trading system (not shown) or exchange computing system thereof. The system 100 includes a processor 102, and a non-transitory memory 104 and may further include a user interface 108 coupled therewith, such as the processor 202, memory 204 and/or interfaces 214, 216, 218 described in detail above with reference to FIG. 2. The system 100 may be coupled, directly or indirectly, such as via an electronic communications network, an external storage, server or database 110 in which data to be encoded, as described, is stored. The system 100 may further include, or provide access to, such as via the network, one or more applications, processes or computer programs which access and utilize the encoded data as described elsewhere herein.

The memory 104 being operative to store instructions, that when executed, cause the processor 102 to implement a data receiver 112, coupled with a processor 102 characterized by a minimum number of bits, e.g., 64, that must be operated, i.e., processed or retrieved/moved, on in a single processor or memory operation, operative to receive electronic data, such as from the database 110, indicative of a plurality of symbol sequences, each comprising a sequence of symbols, e.g., strings, selected from a set of symbols, e.g., the English alphabet.

The memory 104 being further operative to store instructions, that when executed, cause the processor 102 to implement an encoder 114, which may be referred to as a primitive encoder 114, coupled with the data receiver 112 and operative to, for each symbol, e.g., character, of each symbol sequence, e.g., string, convert, or otherwise transform or encode, the data indicative thereof to a minimal representation, e.g., ASCII, which includes a minimum number of bits, e.g., 7, necessary to uniquely represents the symbol among the set of symbols.

The memory 104 being further operative to store instructions, that when executed, cause the processor 102 to implement a data arranger 116 coupled with the encoder 114 and operative to arrange, for each symbol sequence, the converted symbol thereof into one or more groups, each group characterized by a size equal to the minimum number of bits, e.g., one or more 64 bit longs, that must be operated on in a single operation, regardless of how many symbols are in the symbol sequence. For example, the data arranger 116 may utilize bit-wise shift and OR operations construct each 64 bit long.

The memory 104 being further operative to store instructions, that when executed, cause the processor 102 to implement a data writer 118 coupled with the data arranger 116 and operative to store, in the memory 104 or cache 106, each of the groups, e.g., 64 bit long, of converted symbols of each symbol sequence in contiguous, either physically or logically, memory locations with respect to the others of the groups of converted symbols of each symbol sequence, e.g., in an array of longs.

One or more of the data receiver 112, encoder 114, data arranger 116 or data writer 118 may be implemented as a separate component or as one or more logic components, such as on an FPGA which may include a memory or reconfigurable component to store logic and a processing component to execute the stored logic, or as first, second, third and fourth logic respectively, e.g. computer program logic, stored in a memory, such as the memory 204 shown in FIG. 2 and described in more detail above with respect thereto, or other non-transitory computer readable medium, and executable by a processor 102, such as the processor 204 shown in FIG. 2 and described in more detail above with respect thereto, to cause the processor 102 to, or otherwise be operative as described.

In one embodiment, the minimum number of bits that must be operated on in a single operation comprises the word size of the processor 102, the size of each group being equal thereto. In one embodiment, the minimum number of bits that must be operated on in a single processor 102 operation is 64 bits, the size of each group being equal thereto.

In one embodiment, each sequence of symbols of the plurality of symbol sequences comprises a string value representative of one of a key value or a data value of a key/data value pair. It will be appreciated that the data associated with a key may be another key.

In one embodiment, each sequence of symbols of the plurality of symbol sequences comprises one of an English language word or a set of numerals representative of a number.

In one embodiment, the set of symbols comprises the ASCII character set. In one embodiment, the minimum number of bits necessary to uniquely represents the symbol among the set of symbols is seven (7).

In one embodiment, the plurality of symbol sequences is further characterized by an arrangement, e.g., a structure, of each of the plurality of symbol sequences with respect to the others of the symbol sequences of the plurality of symbol sequences, the conversion, arrangement and storage being performed in accordance with the arrangement. In one embodiment, the plurality of symbol sequences comprise a structured database, or portion thereof, such as a comma separated value data set (CSV) or a view/query result of a relational database (RDB).

In one embodiment, the plurality of symbol sequences comprise a nested hierarchical data structure, e.g., XML, JSON, or other self-describing (no schema) data.

In one embodiment, the data arranger 116 is further operative to insert, into the one or more of the groups, i.e., between successive encoded keys, a group comprising data which indicates that a subsequent plurality of groups comprises a nested/embedded data structure, i.e., a nested/embedded DAM, and data which indicates a number of the groups, e.g., a length, thereof, wherein a search of the contiguous memory locations for a particular symbol sequence may skip over a number of the contiguous locations as a function of the data indicative of the number of groups which comprise the nested data structure when it is determined, based on the first of the plurality of groups which comprise the nested data structure, that the particular symbol sequence will not be found in the remainder of the plurality groups which comprise the nested data structure.

In one embodiment, a symbol sequence stored in a particular memory location of the contiguous memory locations is directly retrievable using a memory retrieval operation which addresses, e.g., using the dot notation/syntax described above, the contiguous memory locations based on the nested hierarchical data structure.

In one embodiment, the data arranger is further operative to include in one or more of the groups, data which characterizes the converted symbols included therein, i.e., which indicate a data type.

In one embodiment, the data which characterizes the converted symbols included therein includes data, included in a first of the one or more groups into which the particular symbol sequence has been arranged, indicative of a number of groups, e.g., length, into which the particular symbol sequence has been arranged.

In one embodiment, a search of the contiguous memory locations for a particular symbol sequence requires only one memory retrieval operation by the processor 102 for each group of converted symbols until the particular symbol sequence is found or all of the contiguous memory locations have been searched.

In one embodiment, the data arranger 116 is further operative to include data, in a first of the one or more groups into which the particular symbol sequence has been arranged, indicative of a number of groups into which the particular symbol sequence has been arranged, wherein the search of the contiguous memory locations for a particular symbol sequence may skip over a number of the contiguous locations as a function of the data indicative of the number of groups into which the particular symbol sequence has been arranged when it is determined, based on the first of the one or more groups into which the particular symbol sequence has been arranged, that the particular symbol sequence will not be found in the remainder of the one or more groups into which the particular symbol sequence has been arranged.

In one embodiment, collectively, the groups of converted symbols of each symbol sequence of the plurality of symbol sequences occupy less space in the memory 102 or cache 106 than the plurality of symbol sequences would if stored in the memory 102 or cache 106.

In one embodiment, the system 100 further includes a query module (fifth logic) 120 operative to access a database 110 to execute a query receive, therefrom, the result of the query, e.g., a view, wherein the result comprises the plurality of symbol sequences.

In one embodiment, the system 100 further includes an encoded data access module (sixth logic) 122, which may be implemented as a process, operative to facilitate access to the stored encoded data by receiving queries for specific data items, e.g., in accordance with the above described dot notation/syntax, or queries to search the stored encoded data, from other devices, applications or processes, wherein the data access module 122 executes the query against the stored encoded data and returns the result, if any, to the requestor. In one embodiment, the data access module 122 may further be operative to received requests to modify the stored encoded data or add data to it. In one embodiment, the data access module 122, so as to be able to add data to the stored encoded data, may implement an array copy operation.

Figure 3:
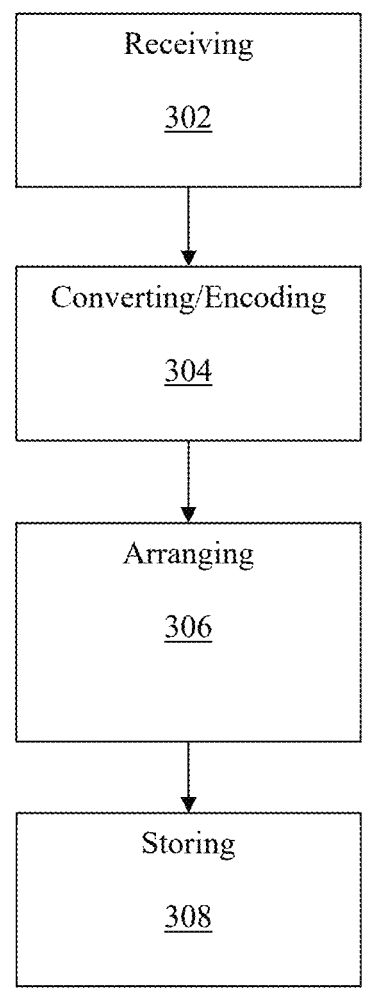
FIG. 3 depicts a flow chart showing the operation of the system of FIG. 1 according to one embodiment.

FIG. 3 depicts a flow chart showing operation of the system 100 of FIG. 1. In particular FIG. 3 shows a method, which may be computer implemented, for storing, or otherwise optimizing the storage of, data in a memory 104, such as in a cache memory 106. The operation of the system 100 may include: receiving, by a processor 102 characterized by a minimum number of bits that must be operated, e.g., processed or retrieved/moved, on in a single (processor or memory) operation, electronic data indicative of a plurality of symbol sequences, each comprising a sequence of symbols selected from a set of symbols (Block 302); for each symbol of each symbol sequence, converting/encoding, by the processor 102, the data indicative thereof to a minimal representation which includes a minimum number of bits necessary to uniquely represents the symbol among the set of symbols (Block 304); arranging, by the processor 102 for each symbol sequence, the converted symbol thereof into one or more groups, each group characterized by a size equal to the minimum number of bits that must be operated on in a single operation, e.g., regardless of how many symbols are in the symbol sequence (Block 306); and storing, by the processor 102 in the memory, each of the groups of converted symbols of each symbol sequence in physically and/or logically contiguous memory locations with respect to the others of the groups of converted symbols of each symbol sequence (Block 308).

In one embodiment, the minimum number of bits that must be operated on in a single operation comprises the word size of the processor 102, the size of each group being equal thereto. In one embodiment, the minimum number of bits that must be operated on in a single operation is 64 bits, the size of each group being equal thereto.

In one embodiment, each sequence of symbols of the plurality of symbol sequences comprises a string value representative of one of a key value or a data value of a key/data value pair. It will be appreciated that the data associated with a key may be another key.

In one embodiment, each sequence of symbols of the plurality of symbol sequences comprises one of an English language word or a set of numerals representative of a number.

In one embodiment, the set of symbols comprises the ASCII character set. In one embodiment, the minimum number of bits necessary to uniquely represents the symbol among the set of symbols is seven (7).

In one embodiment, the plurality of symbol sequences is further characterized by an arrangement, e.g., a structure, of each of the plurality of symbol sequences with respect to the others of the symbol sequences of the plurality of symbol sequences, the conversion, arrangement and storage being performed in accordance with the arrangement. In one embodiment, the plurality of symbol sequences comprise a structured database, or portion thereof, such as a comma separated value data set (CSV) or a view/query result of a relational database (RDB).

In one embodiment, the plurality of symbol sequences comprise a nested hierarchical data structure, e.g., XML, JSON, or other self-describing (no schema) data.

In one embodiment, the arranging further comprises inserting, by the processor 102, into the one or more of the groups, e.g., between successive keys, a group comprising data which indicates that a subsequent plurality of groups comprises a nested, or otherwise embedded, data structure, e.g., a nested/embedded DAM, and data which indicates a number of the groups thereof, i.e., a length, wherein a search of the contiguous memory locations for a particular symbol sequence may skip over a number of the contiguous locations as a function of the data indicative of the number of groups which comprise the nested data structure when it is determined, based on the first of the plurality of groups which comprise the nested data structure, that the particular symbol sequence will not be found in the remainder of the plurality groups which comprise the nested data structure.

In one embodiment, a symbol sequence stored in a particular memory location of the contiguous memory locations is directly retrievable using a memory retrieval operation which addresses, e.g., using the dot notation/syntax described above, the contiguous memory locations based on the nested hierarchical data structure.

In one embodiment, the data arranger is further operative to include in one or more of the groups, data which characterizes the converted symbols included therein, i.e., which indicate a data type.

In one embodiment, the data which characterizes the converted symbols included therein includes data, included in a first of the one or more groups into which the particular symbol sequence has been arranged, indicative of a number of groups, e.g., length, into which the particular symbol sequence has been arranged.

In one embodiment, a search of the contiguous memory locations for a particular symbol sequence requires only one memory retrieval operation by the processor 102 for each group of converted symbols until the particular symbol sequence is found or all of the contiguous memory locations have been searched.

In one embodiment, the arranging further comprises including data, in a first of the one or more groups into which the particular symbol sequence has been arranged, indicative of a number of groups, e.g., a length, into which the particular symbol sequence has been arranged, wherein the search of the contiguous memory locations for a particular symbol sequence may skip over a number of the contiguous locations as a function of the data indicative of the number of groups into which the particular symbol sequence has been arranged when it is determined, based on the first of the one or more groups into which the particular symbol sequence has been arranged, that the particular symbol sequence will not be found in the remainder of the one or more groups into which the particular symbol sequence has been arranged.

In one embodiment, collectively, the groups of converted symbols of each symbol sequence of the plurality of symbol sequences occupy less space in the memory 102 or cache 106 than the plurality of symbol sequences would if stored in the memory 102 or cache 106.

In one embodiment, the operation of the system 100 further includes: accessing, by the processor 102, a database 110 to execute a query (Block 308); and receiving, by the processor 102, the result of the query, e.g., a view, wherein the result comprises the plurality of symbol sequences (Block 310).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for storing data in a memory, the method comprising:
   receiving, by a processor characterized by a minimum number of bits that must be operated on in a single operation, electronic data indicative of each symbol of an ordered plurality of symbol sequences, each symbol sequence comprising a sequence of symbols selected from a set of symbols;
   for each symbol of each symbol sequence in the order in which the symbol sequence appears in the ordered plurality of symbol sequences, converting, by the processor, the data indicative thereof to a minimal representation which includes a minimum number of bits necessary to uniquely represent the symbol among the set of symbols;
   arranging, by the processor for each symbol sequence, the minimal representation of each symbol thereof into one or more groups in the order in which the symbol sequence appears in the ordered plurality of symbol sequences, each group characterized by a size no larger than the minimum number of bits that must be operated on in a single operation; and storing, by the processor in the memory, each of the groups of minimal representations of each symbol of each symbol sequence in the order in which the symbol sequence appears in the ordered plurality of symbol sequences in contiguous memory locations with respect to the others of the groups of minimal representations of each symbol of each symbol sequence.

2. The computer implemented method of claim 1, wherein the minimum number of bits that must be operated on in a single operation comprises the word size of the processor, the size of each group being equal thereto.

3. The computer implemented method of claim 1, wherein the minimum number of bits that must be operated on in a single operation is 64 bits, the size of each group being equal thereto.

4. The computer implemented method of claim 1, wherein each sequence of symbols of the plurality of symbol sequences comprises a string value representative of one of a key value or a data value of a key/data value pair.

5. The computer implemented method of claim 1, wherein each sequence of symbols of the plurality of symbol sequences comprises one of an English language word, a set of numerals representative of a number, or a combination thereof.

6. The computer implemented method of claim 1, wherein the set of symbols comprises the ASCII character set.

7. The computer implemented method of claim 1, wherein the minimum number of bits necessary to uniquely represents the symbol among the set of symbols is seven (7).

8. The computer implemented method of claim 1, wherein the plurality of symbol sequences is further characterized by an arrangement of each of the plurality of symbol sequences with respect to the others of the symbol sequences of the plurality of symbol sequences, the converting, arranging and storing being performed in accordance with the arrangement.

9. The computer implemented method of claim 1, wherein the plurality of symbol sequences comprise a database.

10. The computer implemented method of claim 1, wherein the plurality of symbol sequences comprise a nested hierarchical data structure.

11. The computer implemented method of claim 10, wherein the arranging further comprises inserting, by the processor, into the one or more of the groups, a group comprising data which indicates that a subsequent plurality of groups comprises a nested data structure and data which indicates a number of the groups thereof, wherein a search of the contiguous memory locations for a particular symbol sequence may skip over a number of the contiguous locations as a function of the data indicative of the number of groups which comprise the nested data structure when it is determined, based on the first of the plurality of groups which comprise the nested data structure, that the particular symbol sequence will not be found in the remainder of the plurality groups which comprise the nested data structure.

12. The computer implemented method of claim 10, wherein the minimal representations of each symbol of a symbol sequence stored in a particular memory location of the contiguous memory locations is directly retrievable using a memory retrieval operation which addresses the contiguous memory locations based on the nested hierarchical data structure.

13. The computer implemented method of claim 1, wherein the arranging further comprises including in one or more of the groups, data which characterizes the converted symbols included therein.

14. The computer implemented method of claim 13, wherein the data which characterizes the converted symbols included therein includes data, included in a first of the one or more groups into which the particular symbol sequence has been arranged, indicative of a number of groups into which the particular symbol sequence has been arranged.

15. The computer implemented method of claim 1, wherein a search of the contiguous memory locations for a particular symbol sequence requires only one memory retrieval operation by the processor for each group of converted symbols until the particular symbol sequence is found or all of the contiguous memory locations have been searched.

16. The computer implemented method of claim 15, wherein the arranging further comprises including data, in a first of the one or more groups into which the minimal representations of the particular symbol sequence has been arranged, indicative of a number of groups into which the minimal representations of the particular symbol sequence has been arranged, wherein the search of the contiguous memory locations for a particular symbol sequence may skip over a number of the contiguous locations as a function of the data indicative of the number of groups into which the minimal representations of the particular symbol sequence has been arranged when it is determined, based on the first of the one or more groups into which the minimal representations of the particular symbol sequence has been arranged, that the particular symbol sequence will not be found in the remainder of the one or more groups into which the particular symbol sequence has been arranged.

17. The computer implemented method of claim 1, wherein collectively the groups of minimal representations of the symbols of each symbol sequence of the plurality of symbol sequences occupy less space in the memory than the plurality of symbol sequences would if stored in the memory.

18. The computer implemented method of claim 1, further comprising:

accessing, by the processor, a database to execute a query; and receiving, by the processor, the result of the query, wherein the result comprises the plurality of symbol sequences.

19. A system for storing data in a memory, the system comprising:

a data receiver, coupled with a processor characterized by a minimum number of bits that must be operated on in a single operation, operative to receive electronic data indicative of each symbol of an ordered plurality of symbol sequences, each symbol sequence comprising a sequence of symbols selected from a set of symbols;

an encoder coupled with the data receiver and operative to, for each symbol of each symbol sequence in the order in which the symbol sequence appears in the ordered plurality of symbol sequences, convert the data indicative thereof to a minimal representation which includes a minimum number of bits necessary to uniquely represent the symbol among the set of symbols;

a data arranger coupled with the encoder and operative to arrange, for each symbol sequence, the minimal representation of each symbol thereof into one or more groups in the order in which the symbol sequence appears in the ordered plurality of symbol sequences, each group characterized by a size no larger than the minimum number of bits that must be operated on in a single operation; and a data writer coupled with the data arranger and operative to store, in the memory, each of the groups of minimal representations of each symbol of each symbol sequence in the order in which the symbol sequence appears in the ordered plurality of symbol sequences in contiguous memory locations with respect to the others of the groups of minimal representations of each symbol of each symbol sequence.

20. The system of claim 19, wherein the minimum number of bits that must be operated on in a single operation comprises the word size of the processor, the size of each group being equal thereto.

21. The system of claim 19, wherein the minimum number of bits that must be operated on in a single processor operation is 64 bits, the size of each group being equal thereto.

22. The system of claim 19, wherein each sequence of symbols of the plurality of symbol sequences comprises a string value representative of one of a key value or a data value of a key/data value pair.

23. The system of claim 19, wherein each sequence of symbols of the plurality of symbol sequences comprises one of an English language word, a set of numerals representative of a number, or a combination thereof.

24. The system of claim 19, wherein the set of symbols comprises the ASCII character set.

25. The system of claim 19, wherein the minimum number of bits necessary to uniquely represents the symbol among the set of symbols is seven (7).

26. The system of claim 19, wherein the plurality of symbol sequences is further characterized by an arrangement of each of the plurality of symbol sequences with respect to the others of the symbol sequences of the plurality of symbol sequences, the conversion, arrangement and storage being performed in accordance with the arrangement.

27. The system of claim 19, wherein the plurality of symbol sequences comprise a database.

28. The system of claim 19, wherein the plurality of symbol sequences comprise a nested hierarchical data structure.

29. The system of claim 28, wherein the data arranger is further operative to insert, into the one or more of the groups, a group comprising data which indicates that a subsequent plurality of groups comprises a nested data structure and data which indicates a number of the groups thereof, wherein a search of the contiguous memory locations for a particular symbol sequence may skip over a number of the contiguous locations as a function of the data indicative of the number of groups which comprise the nested data structure when it is determined, based on the first of the plurality of groups which comprise the nested data structure, that the particular symbol sequence will not be found in the remainder of the plurality groups which comprise the nested data structure.

30. The system of claim 28, wherein the minimal representations of each symbol of a symbol sequence stored in a particular memory location of the contiguous memory locations is directly retrievable using a memory retrieval operation which addresses the contiguous memory locations based on the nested hierarchical data structure.

31. The system of claim 19, wherein the data arranger is further operative to include in one or more of the groups, data which characterizes the converted symbols included therein.

32. The system of claim 31, wherein the data which characterizes the converted symbols included therein includes data, included in a first of the one or more groups into which the particular symbol sequence has been arranged, indicative of a number of groups into which the particular symbol sequence has been arranged.

33. The system of claim 19, wherein a search of the contiguous memory locations for a particular symbol sequence requires only one memory retrieval operation by the processor for each group of converted symbols until the particular symbol sequence is found or all of the contiguous memory locations have been searched.

34. The system of claim 33, wherein the data arranger is further operative to include data, in a first of the one or more groups into which the minimal representations of the particular symbol sequence has been arranged, indicative of a number of groups into which the minimal representations of the particular symbol sequence has been arranged, wherein the search of the contiguous memory locations for a minimal representations of the particular symbol sequence may skip over a number of the contiguous locations as a function of the data indicative of the number of groups into which the minimal representations of the particular symbol sequence has been arranged when it is determined, based on the first of the one or more groups into which the particular symbol sequence has been arranged, that the minimal representations of the particular symbol sequence will not be found in the remainder of the one or more groups into which the particular symbol sequence has been arranged.

35. The system of claim 19, wherein, collectively, the groups of minimal representations of the symbols of each symbol sequence of the plurality of symbol sequences occupy less space in the memory than the plurality of symbol sequences would if stored in the memory.

36. The system of claim 19, further comprising:
a query module operative to access a database to execute a query receive, therefrom, the result of the query, wherein the result comprises the plurality of symbol sequences.

37. A system for storing data in a memory, the system comprising:
a processor characterized by a minimum number of bits that must be operated on in a single operation;
means for receiving electronic data indicative of each symbol of an ordered plurality of symbol sequences, each symbol sequence comprising a sequence of symbols selected from a set of symbols;
means for converting, for each symbol of each symbol sequence in the order in which the symbol sequence appears in the ordered plurality of symbol sequences, the data indicative thereof to a minimal representation which includes a minimum number of bits necessary to uniquely represent the symbol among the set of symbols;
means for arranging, for each symbol sequence, the minimal representation of each symbol thereof into one or more groups in the order in which the symbol sequence appears in the ordered plurality of symbol sequences, each group characterized by a size no larger than the minimum number of bits that must be operated on in a single operation; and
means for storing, in the memory, each of the groups of minimal representations of each symbol of each symbol sequence in the order in which the symbol sequence appears in the ordered plurality of symbol sequences in contiguous memory locations with respect to the others of the groups of minimal representations of each symbol of each symbol sequence.

* * * * *